(12) United States Patent
Pore

(10) Patent No.: US 8,830,341 B2
(45) Date of Patent: Sep. 9, 2014

(54) SELECTION OF AN OPTIMUM IMAGE IN BURST MODE IN A DIGITAL CAMERA

(75) Inventor: Vinayak Jayaram Pore, Pune (IN)

(73) Assignee: NVIDIA Corporation, Santa Clara, CA (US)

(*) Notice: Subject to any disclaimer, the term of this patent is extended or adjusted under 35 U.S.C. 154(b) by 874 days.

(21) Appl. No.: 12/125,080

(22) Filed: May 22, 2008

(65) Prior Publication Data

US 2009/0290037 A1  Nov. 26, 2009

(51) Int. Cl.
*H04N 5/228* (2006.01)
*H04N 5/232* (2006.01)

(52) U.S. Cl.
CPC ........... *H04N 5/232* (2013.01); *H04N 5/23222* (2013.01)
USPC ..................................... 348/222.1; 348/221.1

(58) Field of Classification Search
USPC ......... 348/222.1, 333.05, 362, 333.11, 220.1, 348/223.1, 229.1, 333.01, 333.03
See application file for complete search history.

(56) References Cited

U.S. PATENT DOCUMENTS

| | | | |
|---|---|---|---|
| 6,456,737 B1 | 9/2002 | Woodfill et al. | |
| 7,020,783 B2 | 3/2006 | Vange et al. | |
| 7,110,032 B2* | 9/2006 | Furukawa | 348/333.02 |
| 7,236,470 B1 | 6/2007 | Bims | |
| 7,574,016 B2 | 8/2009 | Steinberg et al. | |
| 7,688,379 B2* | 3/2010 | Forman et al. | 348/356 |
| 8,340,512 B2 | 12/2012 | Garg, I et al. | |
| 8,351,776 B2 | 1/2013 | Garg et al. | |
| 2001/0030694 A1* | 10/2001 | Abe | 348/223 |
| 2003/0123751 A1 | 7/2003 | Krishnamurthy et al. | |
| 2003/0128756 A1 | 7/2003 | Oktem | |
| 2005/0024487 A1 | 2/2005 | Chen | |
| 2005/0275747 A1 | 12/2005 | Nayar et al. | |
| 2006/0215924 A1 | 9/2006 | Steinberg et al. | |
| 2006/0221223 A1* | 10/2006 | Terada | 348/333.05 |
| 2006/0274643 A1 | 12/2006 | Choyi et al. | |
| 2006/0291845 A1 | 12/2006 | Sugimoto | |
| 2007/0104472 A1 | 5/2007 | Quan et al. | |
| 2007/0206941 A1 | 9/2007 | Maruyama et al. | |
| 2007/0222883 A1* | 9/2007 | Iwauchi | 348/333.01 |
| 2008/0043686 A1 | 2/2008 | Sperti et al. | |
| 2008/0152245 A1 | 6/2008 | El-Maleh et al. | |
| 2008/0225944 A1 | 9/2008 | Pore et al. | |
| 2014/0079279 A1 | 3/2014 | Pulli et al. | |

OTHER PUBLICATIONS

"Gray World Algorithm","http://scien.stanford.edu/class/psych221/projects/00/trek/GWimages.html", Downloaded Circa: Nov. 14, 2008, pp. 1-5.

(Continued)

*Primary Examiner* — Ahmed A Berhan

(57) ABSTRACT

An aspect of the present invention selects one of the images captured in burst mode as an optimum image based on processing only the captured images, without requiring any external images. According to another aspect of the present invention, the camera settings are set to different combination of values and a frame is formed for each combination of values from the corresponding captured image. Image metrics representing inherent image qualities may be extracted from each of the frames and one of the frames is selected based on the extracted metrics. In an embodiment, each combination of the camera settings includes corresponding values for exposure duration and white balance.

14 Claims, 5 Drawing Sheets

(56) References Cited

OTHER PUBLICATIONS

"Provenzi et al.,". "Mathematical Definition and Analysis of the Retinex Algorithm", "http://www.dti.unimi.it/~rizzi/papers/josa. pdf", Dated:Dec. 2005, pp. 2613-2621, vol. 22, No. 12.

"M. Elad et al.,", "Reduced Complexity Retinex Algorithm Via the Variational Approach", "http://www.cs.technion.ac.il/~ron/PAPERS/jvcir_fast_retinex_2003.pdf", Dated: Jun. 6, 2003, pp. 369-388.

"D. H. Brainard and B. A. Wandell", "Analysis of the Retinex Theory of Color Vision", "http://white.stanford.edu/~brian/papers/color/BrainardWandell1986.pdf", Date: Oct. 1986, pp. 1651-1661, vol. 3, No. 10.

"Harr Transform", "http://online.redwoods.cc.ca.us/instruct/darnold/laproj/Fall2001/LeeHerman/presentation/sld011.htm", Date: 2001, pp. 1-25.

"White Balance", "http://www.cambridgeincolour.com/tutorials/white-balance.htm", Downloaded Circa: Nov. 14, 2008, pp. 1-6.

"Color Balance", "http://en.wikipedia.org/wiki/White_balance", Downloaded Circa: Nov. 11, 2008, pp. 1-7.

"Ahmet M,et al", "Image Quality Measures and Their Performance", "IEEE Trans on Communications", Dated: Dec. 1995, pp. 1-7, vol. 43, No. 12.

"Chun-Hsien Chou, et al". "A Perceptually Tuned Subband Image Coder Based on the Measure of Just-Noticeable-Distortion Profile", "IEEE Trans on Circuits and System for Video Technology", Dated: Dec. 1995, pp. 467-476, vol. 5, No. 6.

"Laplacian of Gaussian (LOG)", "http://fourier.eng.hmc.edu/e161/lectures/gradient/node10.html", Downloaded Circa: Nov. 14, 2008, pp. 1-4.

Sun et al., "A Rate Control Algorithm for Wireless Video Transmission Using Perceptual Tuning", Proceedings of the International Conference on Information Technology: Coding and Computing (ITCC'05), 0-7695-2315-Mar. 2005 IEEE, pp. 1-6. 2005.

Tong et al., "Region of Interest Bases H.263 Compatible Codec and Itsrate Control for Low Bit Rate Video Conferencing", Proceedings of 2005 International Symposium on Intelligent Signal Processing and Communication Systems, pp. 249-252, Dec. 13-16, 2005.

Baccichet et al., "Network-Aware H.264/AVC Region of Interest Coding for a Multi-Camera Wireless Surveillance Network", pp. 1-6, Downloaded Mar. 2007.

Sun et al., "Region-Based Rate Control and Bit Allocation for Wireless Video Transmission", IEEE Transactions on Multimedia, vol. 8, No. 1, pp. 1-10, Feb. 2006.

Chen et al., "Region-Of-Interest Video Coding Based on Face Detection", Springer-Verlag Berlin Heidelberg, pp. 1201-1211, 2002.

Baccichet, "H.264/AVC Compliant Solutions for Slep-Based Error Robustness and for Video Surveillance", I.E.I.I.T.—National Research Center Turin-Italy, pp. 1-29, Stanford, Dec. 9, 2005.

* cited by examiner

SELECTION OF AN OPTIMUM IMAGE IN BURST MODE IN A DIGITAL CAMERA

BACKGROUND

1. Field of Disclosure

The present disclosure relates generally to digital cameras, and more specifically to a selection of an optimum image in a burst mode.

2. Related Art

A digital camera generally refers to a device which captures images of respective scenes in the form of digital values. Each digital value may represent a corresponding color/intensity characteristic of a small portion termed as a pixel, and the digital value may be referred to as a pixel value. The pixel values together may be viewed as a matrix of values representing each image.

Digital cameras often provided the ability to capture images in burst mode (also commonly referred to as continuous mode). In a burst mode of operation, the digital camera typically captures multiple successive images of potentially the same scene with stationary or moving objects.

There is often a need to select one of such successive images as an optimum image. For example, within a burst mode, more images than those that need to be provided to a user may be captured, and thus only some (e.g., a single image) of such captured images may be selected and provided to the user.

The selection of an image from multiple images captured in a burst mode, can be based on various criteria. An optimum image generally has a desired balance of various parameters, potentially within acceptable deviations. For example, the parameters may be chosen to ensure that the displayed image corresponding to the selected captured image is visually acceptable.

At least for ease of use, it is often desirable that the selection be performed automatically. Automatic selection may be appreciated in comparison with manual selection, in which, the user may be displayed all the captured images, and the user indicates a preference for one of the displayed images using a suitable interface. Thus, automatic selection implies selection without such user intervention in choosing one of the captured images.

Various aspects of present invention provide for automatic selection of an optimum image in burst mode in a camera.

BRIEF DESCRIPTION OF THE DRAWINGS

Example embodiments will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

Overview

An aspect of the present invention selects one of the images captured in burst mode as an optimum image based on processing only the captured images, without requiring any external images. Due to such automatic selection, the ease of use of a digital camera may be simplified.

According to another aspect of the present invention, the camera settings are set to different combination of values and a frame is formed for each combination of values from the corresponding captured image. Image metrics representing inherent image qualities may be extracted from each of the frames and one of the frames is selected based on the extracted metrics.

In an embodiment, each combination of the camera settings includes corresponding values for exposure duration and white balance. The values for each of these settings can be determined based on techniques such as bracketing in which a base value may be chosen and each value is computed with delta (small value) difference(s) from the base value.

According to an aspect of the present invention, the image parameters extracted for each frame include an edge count, an overall luma level of the frame, a color cast distance, and smoothness within the captured image. At least some of these parameters may be computed based on a luma matrix, with each entry in the luma matrix representing the brightness of the corresponding pixel.

According to another aspect of the present invention, frames are examined for close luma distribution (i.e., how close the brightness of the pixels are) and the frames satisfying such criteria are selected as an optimum frame with an enhanced probability.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Digital Camera

Figure 1:
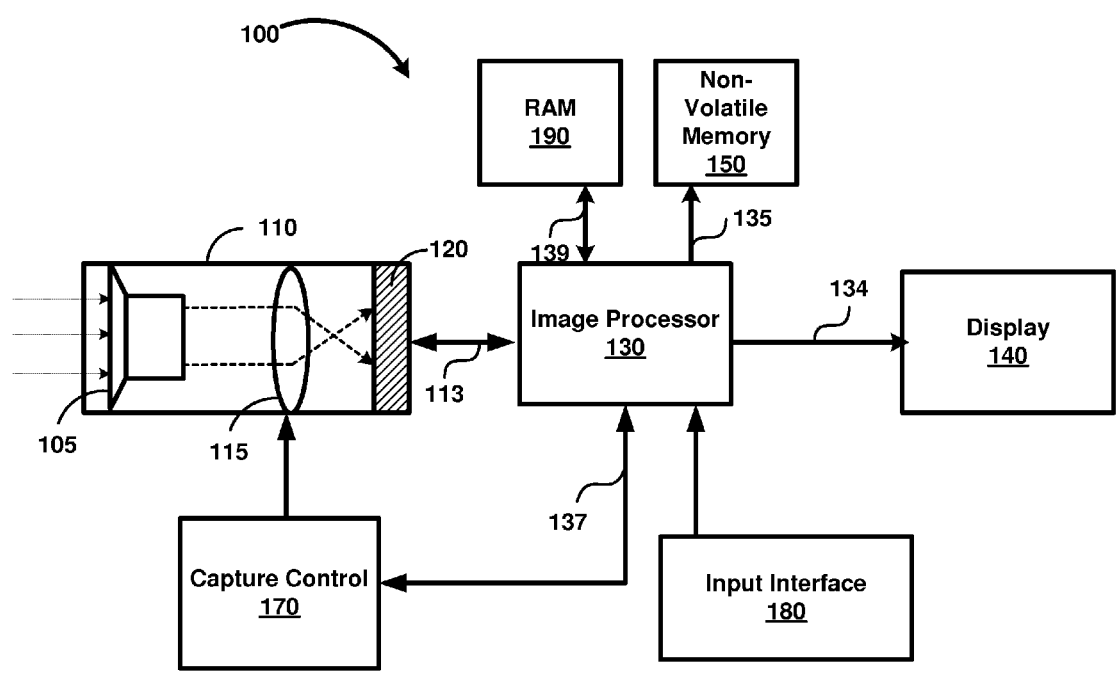
FIG. 1 is a block diagram of a digital camera illustrating an example embodiment in which several features of the present invention can be implemented.

FIG. 1 is a block diagram illustrating the details of an example digital camera in which several features of the present invention may be implemented. Digital camera 100 is shown containing image capture block 110, image processor 130, input interface 180, RAM 190, Non-Volatile RAM 150, capture control 170, and display 140.

Digital camera 100 is shown containing only representative blocks/components for illustration. However, real-world digital cameras may contain more or fewer components as will be apparent to one skilled in the relevant arts. Implementations of such digital cameras are also contemplated to be within the scope and spirit of various aspects of the present invention. Each block/component of FIG. 1 is described below in detail.

Image capture block 110 generates digital values (pixel values) representing an image represented by light rays shown received from externally. Pixel values representing a single image may be sent upon receipt of appropriate control/hand-shake signals from capture control 170 on path 113. Accordingly, the control signals may be received as many times as the number of frames sought to be generated in a burst mode. Alternatively, another type of control signals may also be designed to cause image capture block 110 to send pixel values representing images in burst mode (in response to single instance of receipt of such type of control signals).

An embodiment of image capture block 110 is shown containing shutter 105, optical lens assembly 115, and image sensor array 120. Image sensor array 120 is exposed to the scene when shutter 105 is open. Shutter 105 may be implemented as an opaque window that is moved in one direction to let light in and in another direction to close off the light.

Image sensor array 120 may contain an array of sensors, which together generate digital values representing an image represented by light rays received via lens assembly 115 when shutter 105 is open. Each sensor may generate a digital value representing the corresponding point (small portion) of the image. The digital value can be in RGB format, with each component value being proportionate the corresponding color intensity and time of exposure. Image sensor array 120 may forward the array of digital values as a stream sequentially to image processor 130 on path 113 for further processing.

In an embodiment, image sensor array 120 is implemented as a CCD (charge coupled device)/CMOS sensor array. Image Capture block 120 thus forwards the image captured as an array of digital values sequentially to Image processor 130 on path 113 for further processing. As noted above, the images may be generated and sent in quick succession to support burst mode in response to corresponding control signals received from capture control 170.

It should be appreciated that the structure/technique described above is merely illustrative. However, various other structures/techniques, potentially using more/fewer/different components, as suited for the specific requirements, can be used without departing from the scope and spirit of various aspects of the present invention, as will be apparent to one skilled in the relevant arts by reading the disclosure provided herein.

Capture control 170 controls the operation of various components of image capture block 110 in response to corresponding control signals received from image processor 130 to cause images to be captured and provided to image processor 130. In the embodiment of FIG. 1, capture control 170 is shown coupled to lens assembly 115, and operates to adjust the absolute position of optical lens assembly 115, and/or relative positions of individual lenses within lens assembly 115, in response to receiving a corresponding analog signal from the image processor 130. Capture control 170 may be coupled to lens assembly 115 in a manner facilitating movement of either the whole of lens assembly 115 or individual lenses within it. Capture control 170 may also control the duration of exposure by providing the corresponding control signals to shutter 105. The extent of duration for the capture of each frame may be controlled by image processor 130.

In general, the control signals sent to image capture 110 need to support capture and sending of images and can be implemented in a known way, consistent with the implementation of various components of image capture 110. As relevant to burst mode of operation, image control 170 may generate multiple sets of control signals (to image capture 110, with each set of control signals causing one image to be captured) either as a response to a corresponding number of requests from image processor 130 or as a response to a single request (of corresponding type) from image processor 130.

Display 140 displays specific images (or frames, which are digital representation of the same image, after appropriate processing) provided by image processor 130 on path 134. The frames may correspond to the captured images, user interface (described below), or a combination of both. RAM 190 stores program (instructions) and/or data used by image processor 130 during execution (of the instructions). The data stored may include pixel values that are to be processed and/or to be used later.

Non-volatile memory 150 stores frames received from image processor 130 via path 135. At least some of the frames may correspond to those selected according to several aspects of the present invention. The frames may also be retrieved from non-volatile memory 150 by image processor 130 and provided to display 140 for display upon receipt of appropriate signals from the user interface. In an embodiment, non-volatile memory 150 is implemented as a flash memory. Alternatively, non-volatile memory 150 may be implemented as a removable plug-in card, thus allowing a user to move the captured images to another system for viewing or processing or to use other instances of plug-in cards.

Non-volatile memory 150 may contain an additional memory unit (e.g. ROM, EEPROM, etc. or storage medium, in general), which store various instructions, which when executed by image processor 130 provide various features of the present invention described in sections below. In general, one or more of RAM 190, non-volatile memory (whether removable or not) from which instructions can be retrieved and executed are referred to as a computer readable storage medium.

Input interface 180 enables a user to provide various inputs which control the operation of various components of the digital camera. The inputs may specify various modes of operation (e.g., manual settings, auto-focus, or complete automatic mode). An input may also be presented to enable a user to indicate whether a burst mode of operation is to be used in providing a single image to the user. Alternatively, a complete automatic mode may imply that the burst mode is also automatically used in selecting a single frame that is provided (e.g., stored in non-volatile memory 150 and/or sent for viewing to display 140).

Image Processor 130 receives images in burst mode and selects one of the images/frames according to several aspects of the present invention. For example, N (e.g., N being any desired integer greater than one) images may be received in sequence and one of the N images may be selected. It should be further appreciated that many more images than N images (integral multiple of N images) can be received as a single burst and one out of every successive N images may be selected. The selected images are provided to the user, for example, by storing on non-volatile memory 180.

In addition to selection of images received in burst mode, image processor 130 may provide appropriate controls to other components (e.g., capture control 170) according to various inputs received from input interface 180. The control signals may control the focal length of the lens assembly, the duration of exposure, and any other aspects of operation of the components of the digital camera, as relevant to selection of the images captured in burst mode according to the approach employed.

As noted above, image processor 130 selects from among the images received in burst mode. An aspect of the present invention enables such selection to be performed automatically by examining only the images received in burst mode. In other words, an external reference frame may not be needed in the selection of an image. The manner in which such a feature can be obtained is described below with examples.

3. Selection of Image

Figure 2:
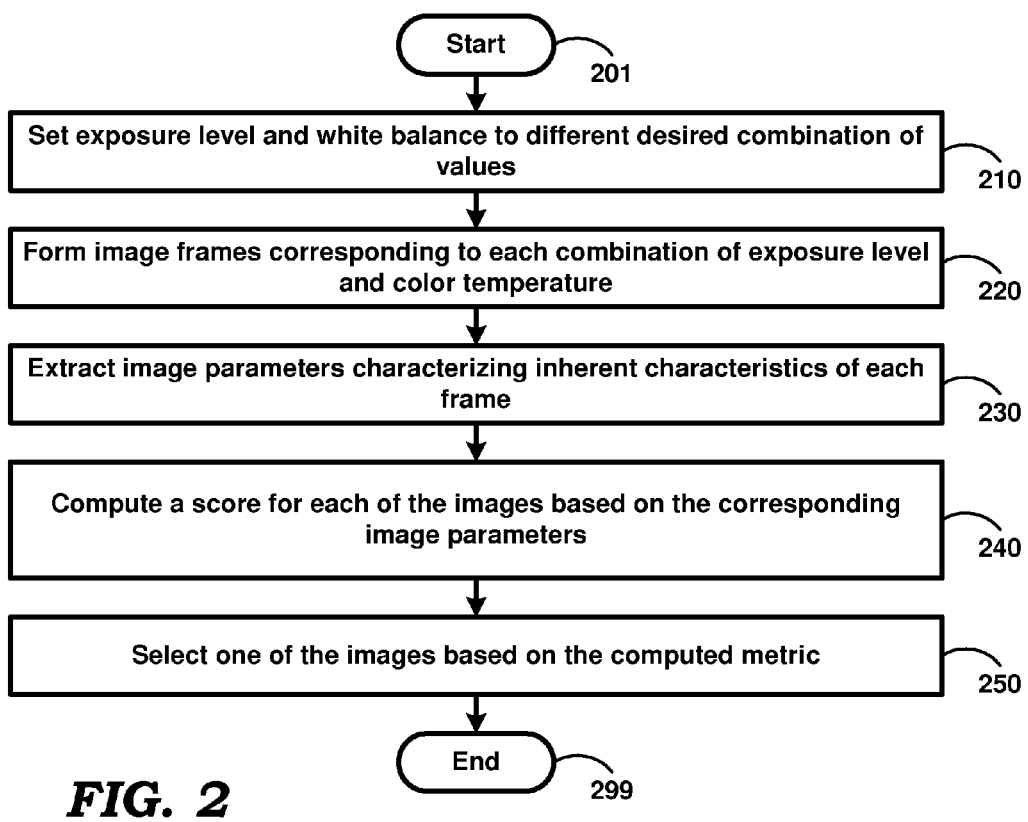
FIG. 2 is a flow chart illustrating the manner in which an image is selected in burst mode operation of a camera in one embodiment.

FIG. 2 is a flowchart illustrating the manner in which an image is selected from multiple images captured in burst mode, according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, image processor 130 sets exposure level and white balance to different desired combination of values. Exposure level generally determines the quantum of light (by way of duration of exposure and/or extent of opening of the shutter) which is permitted to be incident on image sensor 120. White balance on the other hand refers to parameters used in compensating for color temperature of a light source illuminating the scene being captured as image frames. The parameter set affects the manner in which the pixel values of images are set and such adjustments are performed in a known way.

The exposure levels and white balance value combinations can be chosen using several approaches. In one approach referred to as a bracketing, for each of the variables (exposure level and white balance), a mean or centre value may be chosen and a fixed number of values higher and lower than such centre value may be used. For example, 2 values on either side of a mean value may be chosen to form 5 values for exposure level. Assuming 7 values are also chosen for white balance, a total of (7×5=) 35 combinations of values may be chosen and corresponding number of images captured.

Image processor 130 may control the operation of various components to set the parameters to each desired combination of values. For example, in case of exposure level, appropriate control signals may be sent to capture control 170 as described above. On the other hand, in case of white balance, appropriate registers (within image processor 130, not shown) may be configured with (stored) the corresponding value to cause the corresponding white balance adjustment.

In step 220, image processor 130 forms frames from the images corresponding to each combination of exposure level and color temperature. In general, a frame is used to refer to the image, after any alteration of pixel values altered due to internal processing (e.g., white balancing). The terms frame and image are used interchangeably occasionally as referring to the representation of the captured light signals. Furthermore, the frame may contain a fewer pixels than the captured image, for example, to reduce the computational complexity as described in sections below.

As may be appreciated, image processor 130 may receive each image with the corresponding exposure level (as set in step 210). On the other hand, the received pixel values may be altered according to the white balance setting by additional processing performed within image processor 130. With or without any altering, the pixel values together constitute a frame as well. It may be further appreciated that the images may be received in a burst mode, representing the same scene.

In step 230, image processor 130 extracts image parameters characterizing inherent characteristics of each frame. A characteristic of a frame is said to be inherent if the corresponding image parameter can be computed (or extracted) based merely on the pixel values of the frame. It should be appreciated that various inherent characteristics, as suited for the specific environment, can be used, even though the description in sections below is provided with respect to examples for illustration.

In step 240, image processor 130 computes a score for each of the images based on the corresponding image parameters. In an embodiment, the computation approach is chosen such that the score is higher when a corresponding image parameter indicates that an image is more suited to be an optimum frame. In general, the score needs to be higher for desirable qualities such as low error (deviation from ideal image representation), acceptable brightness level of the image, etc. The score may be conveniently represented as a single value (for each of further processing). However, the score can be represented by a small number of values, as suited in the specific environment.

In step 250, image processor 130 selects an image which has the highest score among all the scores computed for all the images in step 240. The image with the highest score is considered an optimum image assuming that the computation of step 240 generates a greater value when an inherent characteristic indicates that it is a more optimal frame. However, the computation approach can be altered to select the frame with the lowest score and accordingly the lowest/highest scores may be referred to as extreme scores. Control passes to step 299, in which the flowchart ends.

It should be appreciated that the flow chart of FIG. 2 can be used to provide a single frame to a user or multiple frames may be selected (and provided to the user) from a larger set of captured frames (by image sensor 120) received in burst mode.

It may be further appreciated that exposure level bracketing and white balance bracketing techniques are used to form several frames of interest (of potentially the same scene), and one of the frames is selected based on the inherent image characteristics of the captured frames. Due to such an approach, an optimal frame may be selected without regard to external reference frames, thereby making the image selection in burst mode more user friendly.

In addition, exposure level represents an example setting which affects the pixel values of the captured image, while white balancing setting represents an example setting which affects the manner in which the captured pixel values are altered. However, different (number/type) settings can be chosen to select an optimum image without departing from the scope and spirit of the several aspects of the present invention, as will be apparent to one skilled in the relevant arts.

Furthermore, the selection of an optimum frame can be based on any combination of inherent image characteristics, as suited in the specific environment. The description is continued with respect to an example set of inherent image characteristics and the manner in which the characteristics can be used to select an optimum frame.

4. Computing Image Parameters

Figure 3:
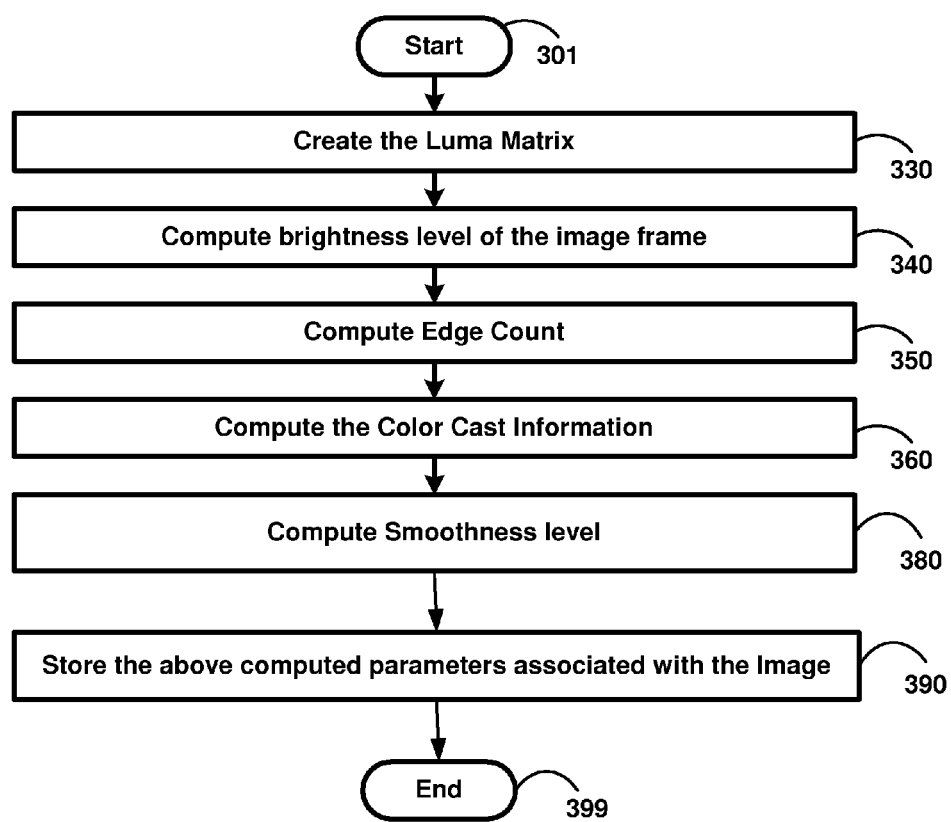
FIG. 3 is a flow chart illustrating the various image parameters used in image selection in an embodiment.

FIG. 3 is a flowchart illustrating an example set of inherent image characteristics used in selection of an optimal frame and the manner in which image parameters representing the inherent image characteristics are computed in an embodiment of the present invention. However, alternative embodiments, which use a different set of inherent image characteristics and different formula/approaches to compute image parameters, may be implemented in other environments also without departing from the scope and spirit of several aspects of the present invention.

In addition, some of the steps may be performed in a different sequence than that depicted below, as suited in the specific environment, as will be apparent to one skilled in the relevant arts. Many such implementations are contemplated to be covered by several aspects of the present invention. The flow chart begins in step 301, in which control immediately passes to step 330.

In step 330, image processor 130 creates a luma matrix representing the luma/brightness level of each pixel of the frame, and thus may have the same dimensions (or same number of pixels/entries) as the frame. Each value of the luma matrix is obtained by averaging the Red, Green and Blue component values of the pixel in the same relative position in the frame. The luma matrix may be considered as a grey-scaled black-white image of the original color image. Luma matrix thus obtained is used in the following steps to calculate various image parameters. Each value (entry) in ith row jth column of the luma matrix is thus computed as:

$$I_s^{luma}(i,j) = Avg(I_{s(i,j,k)}) \text{ for all } k \quad \text{Equation (1)}$$

wherein k represents each of the 3 color components in case of RGB representation.

In step 340, image processor 130 computes a luma parameter representing the general brightness level of the frame. In an embodiment, the luma parameter $I_{luma}$ is computed as an average of intensity/luminance of the pixels of the frame according to the following equation:

$$I_{luma} = Avg(I_s^{luma}(i,j)) \text{ for all } i \text{ and } j \quad \text{Equation (2)}$$

wherein Avg is the averaging operator,
$I_{luma}$ is the luminance value of the corresponding pixel,
$I_s^{luma}$ is a luma matrix with each entry representing a brightness level of the corresponding pixel,
i,j refer to the x,y co-ordinate positions of the pixel assuming the frame is represented by the pixels in a two-dimensional (X, Y) plane.

While the above equation computes an average brightness of all the pixels of the frame, it should be appreciated that different formula or basis (i.e., the set of pixels) can be used as generally representing the brightness (or luma) level of the frame.

In step 350, image processor 130 computes an edge count representing the sharpness characteristic of the frame. Edge may be viewed as the boundary of any shape of an object and can be detected based on a significant change (of luminance intensity) of contiguous pattern (line, contour, etc.) of pixels compared to surrounding pixels. For multiple frames (of the same scene) formed with different combination of values of white balance and exposure, an image may be considered a more optimum image for a higher value of edge count (assuming other inherent characteristics are measured to be the same).

Edge count can be computed based on an examination the individual entries in the luma matrix, using one of several approaches as is well known in the relevant arts. In an embodiment, the edge count information is obtained by summing the pixels of an Edge image, which results when the "Laplacian of Gaussian" (LoG) operation is performed on the Luma matrix $I_s^{luma}$, obtained in step 330.

$$I_{edge\_cnt} = \text{Sum of the pixels in the Edge Image} \quad \text{Equation (3)}$$

In step 360, image processor 130 computes a color cast parameter representing a color bias present in the captured frame. As is well known in the relevant arts, color bias/cast refers to unwanted color/tint added or introduced usually into all pixels of the captured image (in addition to the ideal pixel colors alone that represent the captured scene accurately) due to reasons such as effect of different light sources, etc.

Thus, the pixel values captured may be viewed as containing both an ideal color value and a color bias. In general, a higher color cast (or color bias) implies that the corresponding frame is less suited as an optimal frame.

The color cast parameter also can be computed by examining the pixel values of the captured frame using one of various well known techniques. In an embodiment, the color cast for each frame is computed based on "Gray World" approach, well known in the relevant arts. Broadly, the approach is based on an observation that the aggregate values of R, G and B components (respectively) would be substantially equal in most ideal image frames. Thus, substantial deviations one the aggregate values would imply that the corresponding frame is not optimal. The implementation, in one embodiment, is described briefly below.

The average values (AvgR, AvgG, AvgB) of each of R, G, B components of the pixels of the captured frame are computed according to below equations, assuming that the component values are organized as a three dimensional matrix, with the third dimension representing one of red (value of 0), blue (value of 1) and green (value of 2):

$$AvgR = Avg(I_{(i,j,0)}), \text{ for all } i \text{ and } j \quad \text{Equation (4)}$$

$$AvgG = Avg(I_{(i,j,1)}), \text{ for all } i \text{ and } j \quad \text{Equation (5)}$$

$$AvgB = Avg(I_{(i,j,2)}), \text{ for all } i \text{ and } j \quad \text{Equation (6)}$$

An average value of the above computed averages of the component may then be computed as:

$$AvgVal = Avg(AvgR, AvgG, AvgB) \quad \text{Equation (7)}$$

A gain value (GainR, GainG and GainB) for each of the components may then be computed according to the below equations:

$$GainR = AvgVal/AvgR \quad \text{Equation (8)}$$

$$GainG = AgvVal/AvgG \quad \text{Equation (9)}$$

$$GainB = AgvVal/AvgB \quad \text{Equation (10)}$$

The color cast for the frame may then be computed according to:

$$I_{color\_cast\_from\_unity} = \sqrt{((1-GainR)^2 + (1-GainG)^2 + (1-GainB)^2} \quad \text{Equation (11)}$$

Thus, Equation 11 provides deviation from the unit gain (1,1,1). If the distance is more, the frame is considered less suitable for optimal frame consideration.

However since the scores for the images/frames in final computations are maximized, this parameter is conveniently converted as $$I_{color\_cast\_dist} = 1 - I_{color\_cast\_from\_unity} \quad \text{Equation (11A)}$$

$I_{color\_cast\_dist}$ as calculated in Equation (11A), gives a measure of color bias in the image, though alternative approaches can be employed to compute the same parameter value.

In Step 380, a smoothness level, as a measure of the reciprocal of noise, is computed for each of the image frames. Noise is a measure of the desired image content relative to the extraneous image content. The noise component may be viewed as being introduced due to the deviation of the corresponding settings (with which the frame has been captured/formed). The extent of deviation is sought to be estimated based on the pixel values alone as described below.

The noise is estimated based on an observation that images are generally smooth (implying that the probability of two adjacent/next pixels being the same is high) and differences of pixel values of adjacent pixels is a measure of noise. Thus, a higher value for smoothness level represents the desirability of a frame as an optimum image.

In an embodiment, Harr Transform, well known in the relevant arts, is used to calculate High band edge energy parameter, which is further used in the calculation of smoothness level for a captured frame. The use of such a transform in term of the equations involved is described as below:

$$I_{harr(i/2,j)} = (I_s^{luma}{}_{(i,j)} + I_s^{luma}{}_{(i+1,j)})/2 \; i=0,2,4,6,8 \quad \text{Equation (12)}$$

$$I_{harr(i/2+image\_width/2,j)} = (I_s^{luma}{}_{(i,j)} - I_s^{luma}{}_{(i+1,j)})/2 \; i=0,2,4,6,8 \quad \text{Equation (13)}$$

$$I_{harr(i,j/2)} = (I_s^{luma}{}_{(i,j)} + I_s^{luma}{}_{(i,j+1)})/2 \; j=0,2,4,6,8 \quad \text{Equation (14)}$$

$$I_{harr(i,j/2+image\_height/2)} = (I_s^{luma}{}_{(i,j)} - I_s^{luma}{}_{(i,j+1)})/2 \; j=0,2,4,6,8 \quad \text{Equation (15)}$$

wherein, $I_s$=the frame being processed, in an embodiment, as a sub sampled image described below $I_s^{luma}$=luma matrix obtained from sub sampled image $I_s$ i,j=co-ordinates of a pixel position $I_{harr(i,j)}$=Harr Transformed image at position (i,j)

Equation 12 gives an image, by averaging the even and odd pixel values along a row. Equation 13 gives an image, by taking the difference between the even and odd pixel values along a row. Equation 14 gives an image, by averaging the even and odd pixel values along a column. Equation 15 gives an image, by taking the difference between even and odd pixel values along a column.

The High band edge energy is calculated on image which has been obtained by taking difference of pixel content both along a row and column of the luma matrix $I_s^{luma}$. An illustration of an image matrix of 4*4 will explain the calculation of the Harr Transform as follows.

$$I_{s(i,j)}^{luma} = \begin{pmatrix} a_{00} & a_{01} & a_{02} & a_{03} \\ a_{10} & a_{11} & a_{12} & a_{13} \\ a_{20} & a_{21} & a_{22} & a_{23} \\ a_{30} & a_{31} & a_{32} & a_{33} \end{pmatrix} \quad \text{Equation (16)}$$

wherein $I_s^{luma}$ the Luma matrix as computed in step 340

$a_{00} \ldots a_{33}$=the pixel value for each of 16 pixel location in the 4*4 image i,j=co-ordinate positions of the pixel in a 2 dimensional array Image matrix which is used for High Band Edge Energy calculation is as under.

$$I_{harr(i,j)}^{high\;band} = \begin{pmatrix} (a_{00} - a_{01} - a_{10} + a_{11})/4 & (a_{02} - a_{03} - a_{12} + a_{13})/4 \\ (a_{20} - a_{21} - a_{30} + a_{31})/4 & (a_{22} - a_{23} - a_{32} + a_{33})/4 \end{pmatrix} \quad \text{Equation (17)}$$

Wherein $I_{harr(i,j)}^{high\_band}$=high band in both direction in Harr transformed image i,j=co-ordinate positions of the pixel in a 2 dimensional array As can be seen, a 2*2 image matrix is calculated from a 4*4 matrix with appropriate pixel position calculated as shown in equation (17).

For an image matrix w*h, wherein w and h represent the width and height of the Image the corresponding Harr transformed image which is used for the calculation of the high band edge energy is given by equation (18).

Sum of High Band Edge Energy= Sum[abs($I_{harr(i,j)}^{high\_band}$)]i,j=0,1,...,w/2,h/2 Equation (18)

wherein, w/2=half the image width, h/2=half the image height

Equation (18) gives the summation of High band edge energy which indicates the noise level information of a particular image.

The smoothness level for each image captured in the burst mode is computed as the reciprocal of Sum of high band energy of the associated Luma matrix of the corresponding captured image:

$$I_{smoothness\_level} = 1/(\text{Sum of High Band Edge Energy}(x)) \quad \text{Equation (19)}$$

wherein x represents each of the image captured in the burst mode.

In Step 390, the image parameters computed in all the above steps are stored in a location in the Non-volatile Memory 150, corresponding to each of the respective images obtained during the Burst mode. Control passes to step 399, in which the flowchart ends.

The parameters representing the inherent characteristics of each of the frames received in burst mode may thus be computed. As noted above, the set of characteristics and the manner of computing the same is merely illustrative, though alternative embodiments can be implemented with other sets and with other computing approaches, as will be apparent to one skilled in the relevant arts by reading the disclosure provided herein.

The parameters can again be used according to various approaches to select one of the captured frames. The description is continued with respect to an example approach to selecting one of the frames using the parameters computed above.

5. Optimum Image Based on Image Parameters

Figure 4:
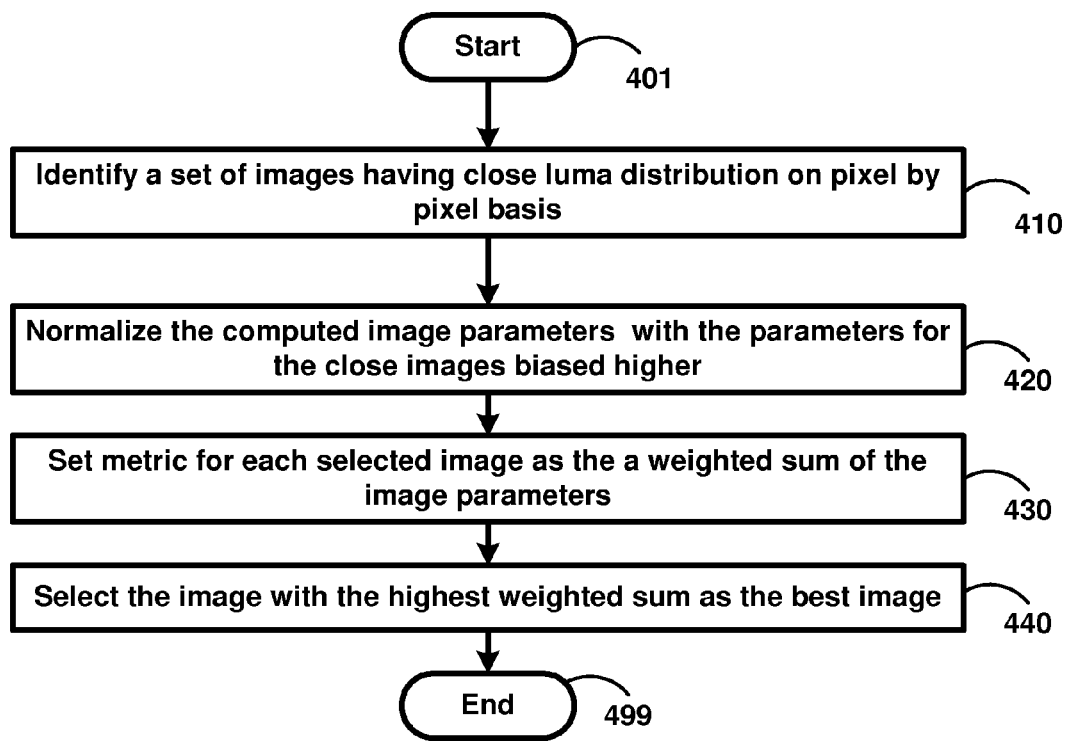
FIG. 4 is a flowchart illustrating the manner in which an optimum frame is selected in an embodiment.

FIG. 4 is a flowchart illustrating the manner in which a frame can be selected from multiple frames according to an aspect of the present invention. The flowchart is described with respect to FIG. 4 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 401, in which control immediately passes to step 410.

In step 410, image processor 130 identifies a set of frames having close luma distribution on a pixel by pixel basis. The closeness of luma distribution may be viewed as a measure of PSNR (Peak signal to noise ratio) for both the images based on an assumption that one of the frames is captured/processed with an ideal combination of settings, and comparison with such an image would indicate close luma distribution. In an embodiment, only 2 image are selected and are termed as best images.

PSNR is computed by considering the $I_s^{luma}$ matrix of the corresponding captured frames, taking two at a time. The manner in which a parameter PSNR may be computed for a pair of frames, is represented by the below equations.

$$d(i,j) = I_{s(i,j)}^{luma}[x] - I_{s(i,j)}^{luma}[y] \text{ for all } i \text{ and } j \quad \text{Equation (20)}$$

wherein $I_{s(i,j)}^{luma}[x]$ represents the entry of luma matrix x, at its i,j co-ordinate positions, and $I_{s(i,j)}^{luma}[y]$ is the pixel content of luma matrix y, at its i,j co-ordinate positions.

$$\text{diff}=\text{sum}[d(i,j)*d(i,j)] \text{ for all } i \text{ and } j \quad \text{Equation (21)}$$

$$\text{PSNR}=10*\log_{10}[255*255/\text{diff}] \quad \text{Equation (22)}$$

From the above, it may be appreciated that the variable diff would represent how much more/less closer/similar frame X generally is, as compared to frame Y. Accordingly, the PSNR for a frame is higher when image X is less close/similar compared to frame Y. The PSNR value may be computed for each frame, in related to other frames captured in burst mode, according to the below pseudo code:

```
for all x (x = 1 to N)
   for all y (y = 1 to N)
      compute PSNR(x,y) ..............Equation(23)
   endfor
endfor
```

Thus, in the pseudo code of Equation (23) above, PSNR is calculated for all images taken 2 at a time, with every image being compared against each of the other images. In equation (23) PSNR is computed for the 2 images which are selected and may be represented with appropriate suffix for example $\text{PSNR}_{(1,2)}$, $\text{PSNR}_{(2,3)}$, $\text{PSNR}_{(4,2)}$, $\text{PSNR}_{(1,N)}$ etc. Some of the PSNR values calculated can be ignored as in $\text{PSNR}_{(1,1)}$, $\text{PSNR}_{(2,2)}$, $\text{PSNR}_{(N,N)}$. Also, $\text{PSNR}_{(1,2)}$ and $\text{PSNR}_{(2,1)}$ will represent the same parameter and hence only one of them can be selected.

The highest PSNR value among all the PSNR values is selected. The two images, based on which the highest PSNR value was generated in Equation 23, are hereafter conveniently referred to as best_image_1 and best_image_2. It should be appreciated that $(N*(N-1))/2$ PSNR values are computed for N frames of the burst mode.

The 2 images as obtained above are given more preference in the final selection of the best image among the total images which are obtained in the burst mode (as noted in step 420 below). The additional preference to the 2 images is done by boosting their smoothness level values obtained in step 380. The manner in which the smoothness levels of the two best images are boosted is captured in equation (24) and equation (25).

$$I_{smoothness\_level}(\text{best\_img\_1})=I_{smoothness\_level}(\text{best\_img\_1})*W_{best\_smoothness} \quad \text{Equation (24)}$$

$$I_{smoothness\_level}(\text{best\_img\_2})=I_{smoothness\_level}(\text{best\_img\_2})*W_{best\_smoothness} \quad \text{Equation (25)}$$

$W_{best\_smoothness}$ is a parameter greater than unity (1.5 in an embodiment, determined empirically) and therefore the new smoothness level values taken by the 2 best images will be higher than their corresponding old smoothness level values as computed in step 380. The new smoothness level values as assigned in equation (24) and equation (25) will be considered for the 2 best images for all the operations going ahead.

In step 420, the image parameters, $I_{luma}$, $I_{edge\_cnt}$, $I_{color\_cast\_dist}$, $I_{smoothness\_level}$ computed in steps 340, 350, 360, 380 of FIG. 3, are normalized to values between 0 and 1. Thus, four unscaled parameters (including those biased higher for the best frames) are received for each of the frames under consideration, and values for all the images for the same parameter are then used for normalization. Thus, four normalization operations may be required for the four image parameters being considered.

In step 430, a weighted metric is computed for each of the frames based on the scaled parameter values of above. The weights may be pre-set or programmatically determined or set by the user. By keeping the weights programmable, the user may control the specific inherent characteristics, which have to be given more preference in the selection of the optimal image.

In step 440, the frame with the highest weighted metric is selected as the optimum frame. The implementation of steps 430 and 440 is realized according to the following pseudo code in one embodiment:

For x=1, 2, 3 . . . N $$\text{Result}(x)=I_{edge\_cnt}(x)*W_{edge}+I_{luma}(x)*W_{luma}+I_{color\_cast\_dist}(x)*W_{color\_cast\_dist}+I_{smoothness\_level}(x)*W_{smoothness}$$

$$\text{Best\_Image\_Score}=\text{Max}[\text{Result}(x)] \quad \text{Equation (26)}$$

wherein N represents the number of images/frames and Result(x) corresponds to the score obtained for an image when the image parameters of image are multiplied by the weights.

The features described above can be implemented based on the pixel values received on path 113. However, given the large number pixels that may be presented in each image, it may be desirable that alternative techniques be employed to reduce the computational requirements. In an embodiment, such reduced computational requirements are obtained by operating on a smaller set of pixel values representing each image, as described below with the details of image processor 130 in one embodiment.

6. Image Processor

Figure 5:
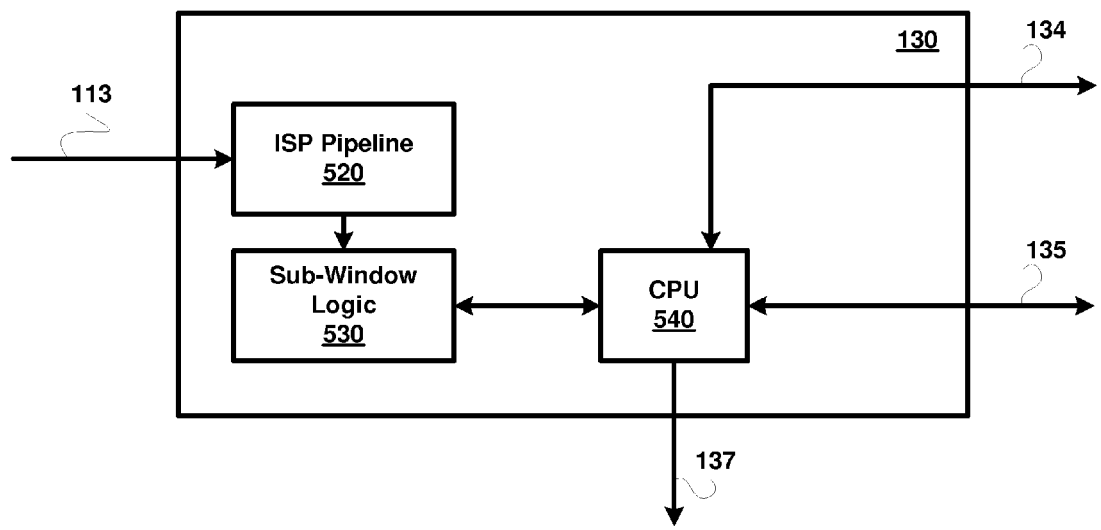
FIG. 5 is a block diagram illustrating the details of an image processor in an embodiment.

FIG. 5 is a block diagram of image processor 130 in one embodiment. Image processor 130 is shown containing image signal processor (ISP) pipeline 520, sub-window logic 530, and central processing unit (CPU) 540. Image processor 130 may contain other components/blocks also, but are not shown as not being relevant to an understanding of the described embodiment(s). Each component is described in detail below.

ISP pipeline 520 receives a stream of pixel values representing an entire image (row wise) on path 113. The pixel values may be received directly from image sensor array 120 (of FIG. 1). ISP pipeline 520 may be implemented as a shift register, and shifts in pixels received on path 113, and transfers (stores) the pixels to buffer registers or other internal buffer. ISP pipeline 520 may perform various operations on the stored pixels such as optical black restoration (subtracting a black color reference level from each of the pixels), sensor linearization (which removes non-linear effects of image sensor array 120), white balance, color correction (transformation of pixel values from one color space to another specific color space), gamma correction, demosaicing (individual R/G/B pixel signals obtained from Bayer color filter array converted to simultaneous R/G/B component values), etc., as suited for the specific environment.

With respect to white balancing, the corresponding values set in step 210 may be received for the sequence of frames received on path 113. The values may be stored in pre-specified registers (not shown) contained within CPU 540, which cause the values to be used for white balancing. Each received frame may be corrected for white balancing according to the corresponding white balancing parameter (stored in the registers). As noted above, the parameters are selected according to bracketing technique. The correction can be performed in a known way. The white balanced pixel values are then provided to sub-window logic.

Sub-window logic 530 receives control inputs from CPU 540 specifying dimensions and locations of one or more sub-windows (rectangular areas) in the captured image that are to be subsampled. For each of a group (for example, 16 adjacent pixels) of pixel values in the sub-window, sub-window logic 530 computes the average of the pixel values in the group, and generates a corresponding single pixel value having the computed average value. The averaged pixels thus generated form a subsampled version of portion of the image in the sub-window, and the subsampled version is provided by sub-window logic 530 to image processor 130 as a smaller set of pixels representing the frame.

These smaller sets of pixels may be further processed according to the flowcharts of FIGS. 3 and 4 described above. Operation on such sub-sampled images reduces the computational requirements in CPU 540. While the embodiment is described operating based on the subsampled frame, it should be appreciated that alternative techniques can be employed to form such smaller set of pixels, which provide the appropriate inputs to the processing described above.

CPU 540 performs the logic specified in FIGS. 2, 4, and 5 based on the subsampled images received from sub-window logic 530. In particular, CPU 540 computes the various parameter values described above and selects one of the captured frames as an optimal frame based on various techniques described in sections above.

7. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of providing an optimum image of a scene in a digital camera, said method comprising:
    setting a plurality of camera settings to a plurality of combination of values, wherein different values of each of said plurality of camera settings affect at least one image characteristic of corresponding captured image, wherein said plurality of camera settings comprises white balance;
    capturing a plurality of images of said scene in a burst mode;
    selecting automatically a first image in said plurality of images by processing only said plurality of images;
    sending said first image as said optimum image of said scene;
    forming a plurality of frames from said plurality of images according to said plurality of combination of values, wherein each frame correspond to an image and to a single combination of values for the camera settings;
    extracting a corresponding plurality of image parameters from each of said plurality of frames; and
    calculating a corresponding metric value for each of said plurality of frames based on the corresponding plurality of image parameters and the plurality of combination of values using which the image is captured,
    wherein said selecting selects one of said plurality of images as said first image based on the corresponding metric values and wherein said plurality of image parameters comprise an edge count, a luma level, a color cast distance, and a smoothness level for each of said frames, and is computed according to a weighted average of said plurality of image parameters.

2. The method of claim 1, wherein said plurality of camera settings comprises exposure duration and wherein each of the values for the corresponding setting are determined by a bracketing approach.

3. The method of claim 1, further comprising:
    computing a luma matrix for each of said frames, wherein said luma matrix has a number of entries as a number of pixels in each frame, wherein each entry of said luma matrix equals a sum of the color components of the corresponding pixel in the frame,
    wherein said edge count and said smoothness level are computed for each frame based on said luma matrix of the frame.

4. The method of claim 3, further comprising:
    determining a set of frames which have close luma distribution, said set of frames being comprised in said plurality of frames; and
    enhancing a probability that each of said set of frames is selected, compared to the remaining ones of said plurality of frames, as said optimum frame.

5. The method of claim 3, wherein said extracting of said smoothness level comprises:
    computing a high band energy as a sum of a plurality of values, wherein each value is generated based on a difference of adjacent entries in said luma matrix; and
    setting the smoothness level of a frame as having inverse correlation to a magnitude of said high band energy.

6. The method of claim 5, wherein said high band energy is computed as a sum of the absolute values of entries in matrix formed by applying Harr transform on said luma matrix.

7. The method of claim 6, wherein said enhancing comprises biasing the smoothness level of each of said set of frames to a corresponding higher value before said computing.

8. The method of claim 1, wherein a set of weights used by said computing are programmable by a user.

9. A non-transitory machine readable storage medium storing one or more sequences of instructions for causing a digital camera to provide an optimum image of a scene, wherein execution of said one or more sequences of instructions by one or more processors contained in said digital camera causes said digital camera to perform the actions of:
    setting a plurality of camera settings to a plurality of combination of values, wherein different values of each of said plurality of camera settings affect at least one image characteristic of corresponding captured image, wherein said plurality of camera settings comprises white balance;
    capturing a plurality of images of said scene in a burst mode;
    selecting automatically a first image in said plurality of images by processing only said plurality of images;
    sending said first image as said optimum image of said scene;
    forming a plurality of frames from said plurality of images according to said plurality of combination of values, wherein each frame correspond to an image and to a single combination of values for the camera settings;
    extracting a corresponding plurality of image parameters from each of said plurality of frames; and
    calculating a corresponding metric value for each of said plurality of frames based on the corresponding plurality of image parameters and the plurality of combination of values using which the image is captured,
    wherein said selecting selects one of said plurality of images as said first image based on the corresponding metric values and wherein said plurality of image parameters comprise an edge count, a luma level, a color cast distance, and a smoothness level for each of said frames, and is computed according to a weighted average of said plurality of image parameters.

10. The non-transitory machine readable storage medium of claim 9, wherein said plurality of camera settings comprise exposure duration and wherein each of the values for the corresponding setting are determined by a bracketing approach.

11. The non-transitory machine readable storage medium of claim 9, further comprising:
computing a luma matrix for each of said frames, wherein said luma matrix has a number of entries as a number of pixels in each frame, wherein each entry of said luma matrix equals a sum of the color components of the corresponding pixel in the frame,
wherein said edge count and said smoothness level are computed for each frame based on said luma matrix of the frame.

12. The non-transitory machine readable storage medium of claim 11, further comprising:
determining a set of frames which have close luma distribution, said set of frames being comprised in said plurality of frames; and
enhancing a probability that each of said set of frames is selected, compared to the remaining ones of said plurality of frames, as said optimum frame.

13. A digital camera comprising:
an image capture block to generate a plurality of sets of pixel values, each of said set of pixel values representing a corresponding one of a plurality of images of a scene captured in a burst mode; and
an image processor to select automatically a first image in said plurality of images by processing only said plurality of images and to send said first image as said optimum image of said scene, wherein said image processor is operable to:
set a plurality of camera settings to a plurality of combination of values, wherein different values of each of said plurality of camera settings affect at least one image characteristic of corresponding captured image, wherein said plurality of camera settings comprises white balance;
form a plurality of frames from said plurality of images according to said plurality of combination of values, wherein each frame correspond to an image and to a single combination of values for the camera settings;
extract a corresponding plurality of image parameters from each of said plurality of frames; and
calculate a corresponding metric value for each of said plurality of frames based on the corresponding plurality of image parameters and the plurality of combination of values using which the image is captured, wherein one of said plurality of images is selected as said first image based on the corresponding metric values, wherein said plurality of camera settings comprise exposure duration and wherein each of the values for the corresponding setting are determined by a bracketing approach, and wherein said plurality of image parameters comprise an edge count, a luma level, a color cast distance, and a smoothness level for each of said frames, and is computed according to a weighted average of said plurality of image parameters.

14. The digital camera of claim 13, wherein said image processor is operable to automatically select said first image without accessing an external reference frame.

* * * * *